United States Patent
Hinokuma et al.

(10) Patent No.: US 10,353,054 B2
(45) Date of Patent: Jul. 16, 2019

(54) LASER RADAR DEVICE

(71) Applicant: Mitsubishi Electric Corporation, Tokyo (JP)

(72) Inventors: Yasuhiro Hinokuma, Tokyo (JP); Takeshi Sakimura, Tokyo (JP); Yosuke Akino, Tokyo (JP); Takayuki Yanagisawa, Tokyo (JP); Hisamichi Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 225 days.

(21) Appl. No.: 15/502,750

(22) PCT Filed: Aug. 12, 2014

(86) PCT No.: PCT/JP2014/071315
§ 371 (c)(1),
(2) Date: Feb. 8, 2017

(87) PCT Pub. No.: WO2016/024332
PCT Pub. Date: Feb. 18, 2016

(65) Prior Publication Data
US 2017/0242100 A1    Aug. 24, 2017

(51) Int. Cl.
*G01S 7/48* (2006.01)
*G01S 7/481* (2006.01)
(Continued)

(52) U.S. Cl.
CPC .......... *G01S 7/4811* (2013.01); *G01S 7/4812* (2013.01); *G01S 7/4817* (2013.01); *G01S 7/4818* (2013.01);
(Continued)

(58) Field of Classification Search
None
See application file for complete search history.

(56) References Cited

U.S. PATENT DOCUMENTS

| 5,900,975 A * | 5/1999 | Sussman | G01S 7/499 |
| | | | 250/559.38 |
| 2008/0137058 A1* | 6/2008 | Cesare | G01S 7/4811 |
| | | | 356/4.01 |

(Continued)

FOREIGN PATENT DOCUMENTS

| EP | 0 283 222 A2 | 9/1988 |
| EP | 2339356 A1 | 6/2011 |

(Continued)

OTHER PUBLICATIONS

International Search Report issued in PCT/JP2014/071315; dated Sep. 16, 2014.

(Continued)

*Primary Examiner* — Hovhannes Baghdasaryan
(74) *Attorney, Agent, or Firm* — Studebaker & Brackett PC

(57) ABSTRACT

Disclosed is a laser light transceiver which is configured so as to include a polarization changing unit 2 for outputting a laser light beam outputted from a transmission light source 1 toward a direction corresponding to the polarization of the laser light beam while changing the polarization of the laser light beam with respect to time. As a result, the laser light transceiver can transmit a laser light beam, whose power is not decreased, in two eye directions without mechanically scanning with the laser light beam.

6 Claims, 6 Drawing Sheets

(51) Int. Cl.
 *G01S 17/58* (2006.01)
 *G01S 17/95* (2006.01)
 *G01S 7/499* (2006.01)
 *G01S 7/491* (2006.01)
 *G01C 3/06* (2006.01)

(52) U.S. Cl.
 CPC ............ *G01S 7/499* (2013.01); *G01S 7/4917* (2013.01); *G01S 17/58* (2013.01); *G01S 17/95* (2013.01); *G01C 3/06* (2013.01); *Y02A 90/19* (2018.01)

(56) References Cited

U.S. PATENT DOCUMENTS

| | | |
|---|---|---|
| 2011/0141471 A1 | 6/2011 | Schlotterbeck et al. |
| 2013/0301096 A1 | 11/2013 | Takahashi |
| 2015/0055115 A1 | 2/2015 | Pedersen et al. |

FOREIGN PATENT DOCUMENTS

| | | |
|---|---|---|
| FR | 2972879 A1 | 9/2012 |
| JP | S63-260390 A | 10/1988 |
| JP | H10-103918 A | 4/1998 |
| JP | 2004-285858 A | 10/2004 |
| JP | 2007-085757 A | 4/2007 |
| JP | 2008-309562 A | 12/2008 |
| WO | 2012/099151 A1 | 7/2012 |
| WO | 2012/123668 A1 | 9/2012 |
| WO | 2013/139347 A1 | 9/2013 |

OTHER PUBLICATIONS

The extended European search report issued by the European Patent Office dated Aug. 2, 2017, which corresponds to European Patent Application No. 14899693.7-1812 and is related to U.S. Appl. No. 15/502,750.

\* cited by examiner

LASER RADAR DEVICE

TECHNICAL FIELD

The present invention relates to a laser light transceiver that emits a laser light beam into space and receives a reflected light beam of the laser light beam, the reflected light beam being reflected by an observation target existing in the space, and a laser radar device that emits a laser light beam into space and receives a reflected light beam of the laser light beam, the reflected light beam being reflected by an observation target existing in the space, and that combines the reflected light beam and a local light beam, to acquire a beat signal.

BACKGROUND ART

The main components of a laser light transceiver disclosed in Patent Literature 1 shown below are as follows:
(1) a laser light source that outputs a laser light beam,
(2) a polarization beam splitter that allows the laser light beam outputted from the laser light source to pass therethrough,
(3) a ¼ wavelength plate that allows the laser light beam passing through the polarization beam splitter to pass therethrough, and
(4) a light receiver that receives a reflected light beam of the laser light beam, the reflected light beam being reflected by a target and returning thereto.

The laser light beam passing through the above-mentioned ¼ wavelength plate is irradiated to a target existing in the space, and a reflected light beam of the laser light beam, the reflected light beam being reflected by the target and returning to the ¼ wavelength plate, passes through the ¼ wavelength plate again.

After the reflected light beam of the laser light beam passes through the ¼ wavelength plate, its polarization is rotated by 90 degrees with respect to that of the laser light beam at the time of being outputted from the laser light source. Accordingly, the reflected light beam of the laser light beam is reflected by the polarization beam splitter and received by a light receiver disposed in a direction different from that in which the laser light source is disposed.

Further, in the laser light transceiver disclosed in Patent Literature 1, a scanner optical element is mounted in order to enable observations in two eye directions, and the laser light beam is scanned by causing a scanner control device to mechanically control the scanner optical element.

The scanner optical element is comprised of a galvanometer mirror, and the scanner control device includes a motor control device that drives the galvanometer mirror.

Patent Literature 2 shown below discloses a laser light transceiver that splits a laser light beam outputted from a laser light source into two beams by using a polarization beam splitter in order to enable observations in two eye directions.

The polarization beam splitter splits the laser light beam outputted from the laser light source into a beam having p polarization and a beam having s polarization, and can split the laser light beam into the beams in two directions.

The polarization beam splitter does not include any movable member which might be broken and can split the laser light beam into the beams in two directions without performing any mechanical control.

CITATION LIST

Patent Literature

Patent Literature 1: Japanese Unexamined Patent Application Publication No. Sho 63-260390 (FIGS. 2B and 3)
Patent Literature 2: Japanese Unexamined Patent Application Publication No. 2004-285858 (FIG. 2)

SUMMARY OF INVENTION

Technical Problem

Because the conventional laser light transceivers are configured as above, the conventional laser light transceivers can perform observations in two eye directions by mechanically controlling a scanner optical element and by scanning with a laser light beam (Patent Literature 1). However, in the case of mechanically controlling the scanner optical element, there is a problem of an increase in size because the conventional laser light transceivers need to include a scanner control device that controls the scanner optical element. A further problem is that the reliability of the device deteriorates because of the movements of the scanner optical element.

Further, in the case of splitting a laser light beam outputted from the laser light source into two beams by using the polarization beam splitter (Patent Literature 2), the reliability of the device can be improved because there is no movable member in the device, but the energy for one pulse is reduced in half because the laser light beam is split into two beams in accordance with the polarization. Accordingly, a problem is that the power of the laser light beam transmitted and received decreases, and the accuracy of observations deteriorates.

The present invention is made in order to solve the above-mentioned problems, and it is therefore an object of the present invention to provide a laser light transceiver and a laser radar device that can transmit a laser light beam, whose power is not decreased, in two eye directions, without mechanically scanning with the laser light beam.

Solution to Problem

According to the present invention, there is provided a laser radar device including: a light source to output a laser light beam; a polarization changing unit to output said laser light beam toward a direction corresponding to polarization of said laser light beam while changing the polarization of said laser light beam outputted from said light source with respect to time; a first transmission and reception optical system to emit the laser light beam outputted from said polarization changing unit into space, and receiving a reflected light beam of said laser light beam, the reflected light beam being reflected by an observation target existing in the space; a second transmission and reception optical system disposed in a direction different from that in which said first transmission and reception optical system is disposed, to emit the laser light beam outputted from said polarization changing unit into the space, and receive a reflected light beam of said laser light beam, the reflected light beam being reflected by an observation target existing in the space; a reception optical system to receive the reflected light beam received by said first transmission and reception optical system, and also receive the reflected light beam received by said second transmission and reception optical system; and a heterodyne detecting unit for combining each of the reflected light beams received by the reception optical system, and a local light beam corresponding to the laser light beam outputted from the light source, to acquire beat signals, in which the heterodyne detecting unit includes: a reflected light beam switching unit for outputting the reflected light beams received by the reception optical system toward directions corresponding to polarization directions of the reflected light beams; a local light beam switching unit for outputting the local light beam corresponding to the laser light beam toward a direction corresponding to polarization of the local light beam while changing the polarization of the local light beam outputted from the light source with respect to time; a first heterodyne detecting unit for combining one of the reflected light beams outputted from the reflected light beam switching unit and the local light beam outputted from the local light beam switching unit, to acquire a beat signal; and a second heterodyne detecting unit disposed in a direction different from that in which the first heterodyne detecting unit is disposed, for combining another of the reflected light beams outputted from the reflected light beam switching unit and the local light beam outputted from the local light beam switching unit, to acquire a beat signal.

Because the laser radar device according to the present invention is configured so as to include the polarization changing unit for outputting the laser light beam outputted from the light source toward a direction corresponding to the polarization of the laser light beam while changing the polarization of the laser light with respect to time, and the local light beam switching unit for outputting the local light beam corresponding to the laser light beam outputted from the light source toward the direction corresponding to the polarization of the local light beam while changing the polarization of the local light beam with respect to time, there is provided an advantage of being able to transmit a laser light beam which does not decrease in its power toward each of two sight line directions without mechanically scanning the laser light beam.

DESCRIPTION OF EMBODIMENTS

Embodiment 1

Figure 1:
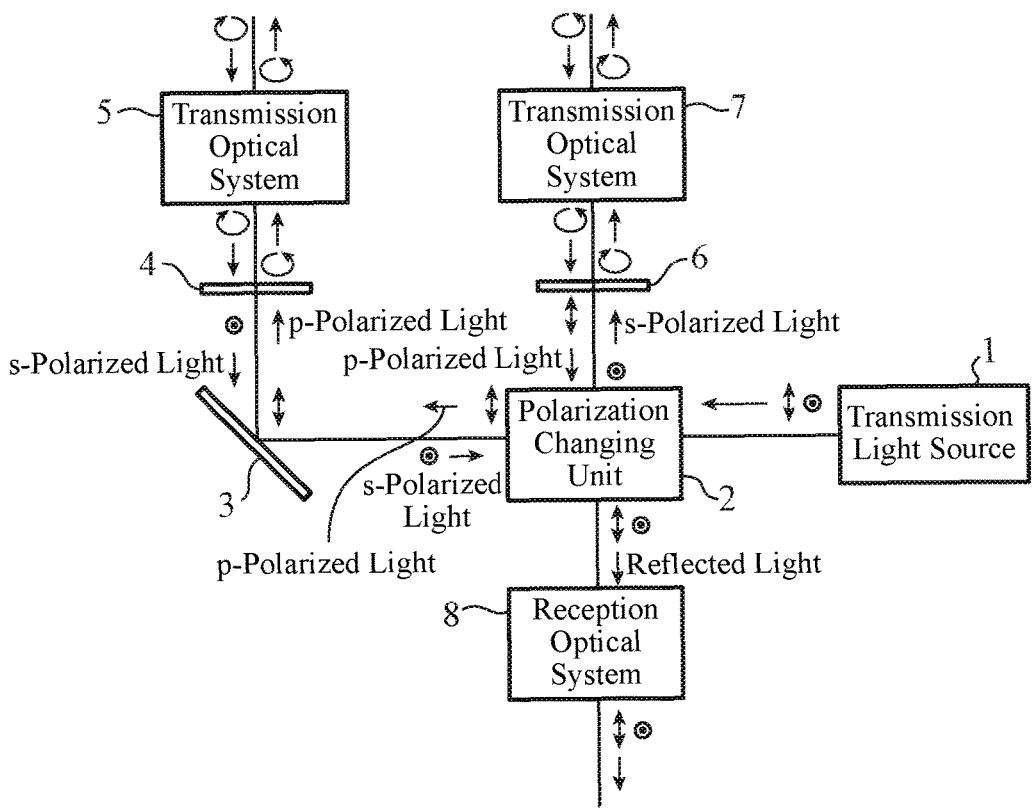
FIG. 1 is a structural diagram showing a laser light transceiver according to Embodiment 1 of the present invention.

FIG. 1 is a structural diagram showing a laser light transceiver according to Embodiment 1 of the present invention.

In the example of FIG. 1, the transmission light source 1 is a light source to output a linearly-polarized laser light beam. In the case in which the laser light transceiver shown in FIG. 1 is used as a Doppler lidar for wind measurements, the transmission light source 1 outputs a laser light beam having a single frequency. Further, in the case in which the laser light transceiver shown in FIG. 1 constructs part of a laser radar device that observes a target (observation target) existing at a long distance, the transmission light source 1 outputs either a pulsed laser light beam having high peak power or a Continuous Wave (CW) light beam.

As the wavelength of the laser light beam, an eye-safe wavelength ranging from 1.5 µm to 1.7 µm is used in many cases because the safety for eyes is taken into consideration.

Although an example in which the transmission light source 1 outputs a linearly-polarized laser light beam is explained in this Embodiment 1, the transmission light source 1 may alternatively output a circularly-polarized laser light beam.

The polarization changing unit 2 outputs the laser light beam outputted from the transmission light source 1 in a direction corresponding to the polarization of the laser light beam while changing the polarization of the laser light beam with respect to time.

More specifically, the polarization changing unit 2 is an optical component to, when a p-polarized laser light beam is outputted from the transmission light source 1, switch, with respect to time, between an output state A in which the polarization changing unit 2 causes the p-polarized laser light beam to pass therethrough toward a reflecting mirror 3, and an output state B in which the polarization changing unit 2 changes the polarization of the laser light beam, which is outputted from the transmission light source 1, from the p polarization to the s polarization by rotating the polarization direction of the laser light beam by 90 degrees, and then reflects an s-polarized laser light beam toward a polarization rotating unit 6. The polarization changing unit 2 constructs a polarization changing means.

Although the example in which the transmission light source 1 outputs the p-polarized laser light beam is explained in this Embodiment 1, the transmission light source 1 may alternatively output the s-polarized laser light beam.

In this case, the polarization changing unit 2 is an optical component to switch, with respect to time, between an output state A in which the polarization changing unit 2 changes the polarization of the laser light beam from the s polarization to the p polarization by rotating the polarization direction of the laser light beam by 90 degrees, and then causes the p-polarized laser light beam to pass therethrough toward the reflecting mirror 3, and an output state B in which the polarization changing unit 2 reflects the s-polarized laser light beam outputted from the transmission light source 1 toward the polarization rotating unit 6.

The reflecting mirror 3 is an optical component to reflect the p-polarized laser light beam outputted from the polarization changing unit 2 toward a polarization rotating unit 4, and to also reflect an s-polarized reflected light beam outputted from the polarization rotating unit 4 toward the polarization changing unit 2.

The polarization rotating unit 4 is comprised of, for example, a ¼ wavelength plate, an azimuth rotator, a Faraday rotator, or a Pockels cell. In the laser light transceiver shown in FIG. 1, assuming that a ¼ wavelength plate is used as the polarization rotating unit 4, the polarization rotating unit 4 converts the p-polarized laser light beam outputted from the reflecting mirror 3, which is a linearly polarized light beam, into a circularly-polarized laser light beam and outputs the circularly-polarized laser light beam to a transmission optical system 5, and also converts a circularly-polarized reflected light beam outputted from the transmission optical system 5 (a reflected light beam of the laser light beam, the reflected light beam being reflected by a target existing in space and then returning thereto) into an s-polarized laser light beam which is a linearly polarized light beam, and outputs the s-polarized laser light beam to the reflecting mirror 3. More specifically, the polarization rotating unit 4 is an optical component to rotate the polarization direction of the reflected light beam emitted from the transmission optical system. 5, passing through the polarization rotating unit 4, and then being outputted to the reflecting mirror 3, by 90 degrees with respect to the polarization direction of the laser beam outputted from the reflecting mirror 3 to the polarization rotating unit 4.

The transmission optical system 5 is comprised of, for example, a lens, a window, and so on. The transmission optical system 5 emits the circularly-polarized laser light beam outputted from the polarization rotating unit 4 into space, and also receives a reflected light beam of the above-mentioned laser light beam, the reflected light beam being reflected by a target existing in the space and returning thereto (the reflected light beam is circularly polarized in a direction opposite to that of the transmission light beam (laser light beam emitted into the space) with respect to the propagation direction of the reflected light beam), and outputs the circularly-polarized reflected light beam to the polarization rotating unit 4.

Although the transmission optical system 5 is mounted in order to implement enlargement of the beam diameter of the transmission light beam which is a laser light beam and collimation of the beam, it is not necessary to mount the transmission optical system 5 in the case in which the transmission light beam does not have to be changed.

The s-polarized reflected light beam outputted from the reflecting mirror 3 to the polarization changing unit 2 is reflected by the polarization changing unit 2 and then outputted to a reception optical system 8.

A first transmission and reception optical system is comprised of the reflecting mirror 3, the polarization rotating unit 4 and the transmission optical system 5.

The polarization rotating unit 6 is comprised of, for example, a ¼ wavelength plate, an azimuth rotator, a Faraday rotator, or a Pockels cell, and is disposed in a direction different from that in which the reflecting mirror 3 is disposed.

In the laser light transceiver shown in FIG. 1, assuming that a ¼ wavelength plate is used as the polarization rotating unit 6, the polarization rotating unit 6 is an optical component to convert the s-polarized laser light beam outputted from the polarization changing unit 2, which is a linearly polarized light beam, into a circularly-polarized laser light beam and output the circularly-polarized laser light beam to a transmission optical system 7, and to also convert a circularly-polarized reflected light beam outputted from the transmission optical system 7 (a reflected light beam of the laser light beam, the reflected light beam being reflected by a target existing in the space and then returning thereto) into a p-polarized laser light beam which is a linearly polarized light beam, and output the p-polarized laser light beam to the polarization changing unit 2.

The transmission optical system 7 is comprised of, for example, a lens, a window, or the like, emits the circularly-polarized laser light beam outputted from the polarization rotating unit 6 into the space, and also receives a reflected light beam of the above-mentioned laser light beam, the reflected light beam being reflected by a target existing in the space and then returning thereto (the reflected light beam is circularly polarized in a direction opposite to that of the transmission light beam (laser light beam emitted into the space) with respect to the propagation direction of the reflected light beam) and outputs the circularly-polarized reflected light beam to the polarization rotating unit 6.

Although the transmission optical system 7 is mounted in order to implement enlargement of the beam diameter of the transmission light beam which is a laser light beam and collimation of the beam, it is not necessary to mount the transmission optical system 7 in the case in which the transmission light beam does not have to be changed.

The p-polarized reflected light beam outputted from the polarization rotating unit 6 to the polarization changing unit 2 passes through the polarization changing unit 2 and then outputted to the reception optical system 8.

A second transmission and reception optical system is comprised of the polarization rotating unit 6 and the transmission optical system 7.

The reception optical system 8 is comprised of, for example, a lens or the like, receives the s-polarized reflected light beam which is reflected by the polarization changing unit 2 after being outputted from the reflecting mirror 3, and also receives the p-polarized reflected light beam which passes through the polarization changing unit 2 after being outputted from the polarization rotating unit 6.

The reception optical system 8 has a function of, in the case in which the reception optical system 8 is coupled with an optical receiving element not illustrated, focusing each reflected light beam outputted from the polarization changing unit 2 to a reception opening of the optical receiving element in order to cause the reflected light beam to enter the reception opening of the optical receiving element without loss.

The reception optical system 8 alternatively includes a function of, in the case in which the reception optical system 8 is coupled with an optical fiber not illustrated, focusing each reflected light beam outputted from the polarization changing unit 2 so as to couple the reflected light beam to the core of the optical fiber.

Next, operations will be explained.

The transmission light source 1 outputs a p-polarized laser light beam which is a linearly polarized light beam.

When a p-polarized laser light beam is outputted from the transmission light source 1, the polarization changing unit 2 outputs the laser light beam toward a direction corresponding to the polarization of the laser light beam while changing the polarization of the laser light beam with respect to time.

More specifically, the polarization changing unit 2 has the output state A in which the polarization changing unit 2 causes the p-polarized laser light beam to pass therethrough toward the reflecting mirror 3, and the output state B in which the polarization changing unit 2 changes the polarization of the laser light beam, which is outputted from the transmission light source 1, from the s polarization to the s polarization by rotating the polarization direction of the laser light beam by 90 degrees, and then reflects the s-polarized laser light beam toward a polarization rotating unit 6. Accordingly, the polarization changing unit 2 implements the output of the laser light beam in two eye directions by switching between the output state A and the output state B with respect to time.

When receiving the p-polarized laser light beam from the polarization changing unit 2, the reflecting mirror 3 reflects the laser light beam toward the polarization rotating unit 4.

When receiving the p-polarized laser light beam from the reflecting mirror 3, the polarization rotating unit 4 converts the p-polarized laser light beam (linearly polarized light beam) into a circularly-polarized laser light beam while the laser light beam passes therethrough, and outputs the circularly-polarized laser light beam to the transmission optical system 5.

When receiving the circularly-polarized laser light beam from the polarization rotating unit 4, the transmission optical system 5 emits the laser light beam into the space as a transmission light beam.

After that, the transmission optical system 5 receives part (reflected light beam) of the laser light beam, the part being reflected by a target existing in the space and then returning thereto, and outputs the reflected light beam to the polarization rotating unit 4. The reflected light beam is circularly polarized in a direction opposite to that of the transmission light beam with respect to the propagation direction of the reflected light beam.

When receiving the circularly-polarized reflected light beam from the transmission optical system 5, the polarization rotating unit 4 converts the circularly-polarized reflected light beam into an s-polarized laser light beam (linearly polarized light beam) while the reflected light beam passes therethrough, and outputs the s-polarized laser light beam to the reflecting mirror 3.

When receiving the s-polarized reflected light beam from the polarization rotating unit 4, the reflecting mirror 3 reflects the reflected light beam toward the polarization changing unit 2.

The s-polarized reflected light beam outputted from the reflecting mirror 3 to the polarization changing unit 2 is reflected by the polarization changing unit 2 and then outputted to the reception optical system 8.

When receiving the s-polarized laser light beam from the polarization changing unit 2, the polarization rotating unit 6 converts the s-polarized laser light beam (linearly polarized light beam) into a circularly-polarized laser light beam while the laser light beam passes therethrough, and outputs the circularly-polarized laser light beam to the transmission optical system 7.

When receiving the circularly-polarized laser light beam from the polarization rotating unit 6, the transmission optical system 7 emits the laser light beam into the space as a transmission light beam.

After that, the transmission optical system 7 receives part (reflected light beam) of the laser light beam, the part being reflected by a target existing in the space and then returning thereto, and outputs the reflected light beam to the polarization rotating unit 6. The reflected light beam is circularly polarized in a direction opposite to that of the transmission light beam with respect to the propagation direction of the reflected light beam.

When receiving the circularly-polarized reflected light beam from the transmission optical system 7, the polarization rotating unit 6 converts the circularly-polarized reflected light beam into a p-polarized laser light beam (linearly polarized light beam) while the reflected light beam passes therethrough, and outputs the p-polarized laser light beam to the polarization changing unit 2.

The p-polarized reflected light beam outputted from the polarization rotating unit 6 to the polarization changing unit 2 passes through the polarization changing unit 2, and is then outputted to the reception optical system 8.

The reception optical system 8 receives the s-polarized reflected light beam which is reflected by the polarization changing unit 2 after being outputted from the reflecting mirror 3, and also receives the p-polarized reflected light beam which passes through the polarization changing unit 2 after being outputted from the polarization rotating unit 6.

More specifically, the reception optical system 8 receives both the s-polarized reflected light beam and the p-polarized reflected light beam in a state in which the reflected light beams are orthogonal in terms of polarization.

In the case in which the laser light transceiver shown in FIG. 1 is used as a Doppler lidar for wind measurements, an aerosol in the air is a target, and the frequency of a reflected light beam of the laser light beam, the reflected light beam being scattered by the aerosol, is shifted by a Doppler frequency corresponding to the moving speed of the aerosol (wind speed), so that the wind speed can be measured from the frequency of the reflected light beam.

Further, since the laser light transceiver according to Embodiment 1 emits laser light beams in the two eye directions, the laser light transceiver can carry out observations in the two eye directions and measure the direction of the wind in the plane including the two directions. Further, a distance to the target can be calculated from the time which has elapsed until the laser light transceiver emits a laser light beam and then receives a reflected light beam.

As can be seen from the above description, because the laser light transceiver according to Embodiment 1 is configured so as to include the polarization changing unit 2 to output a laser light beam toward a direction corresponding to the polarization of the laser light beam while changing the polarization of the laser light beam outputted from the transmission light source 1 with respect to time, there is provided an advantage of being able to transmit a laser light beam, whose power is not decreased, in two eye directions without mechanically scanning with the laser light beam.

More specifically, by disposing the polarization changing unit 2 to output a laser light beam toward a direction corresponding to the polarization of the laser light beam, Embodiment 1 can implement observations in the two eye directions and achieve downsizing and weight reduction of the device without disposing a plurality of transmission light sources 1 and a plurality of reception optical systems 8.

Further, since the laser light transceiver does not have to include a scanner to mechanically scan with a laser light beam in order to carry out observations in two eye directions, the device can be downsized and the reliability of the device can be improved (the degree of tolerance to vibrations and shocks can be increased).

Embodiment 2

Although the laser light transceiver including the polarization changing unit 2 to output a laser light beam outputted from the transmission light source 1 toward a direction corresponding to the polarization of the laser light beam while changing the polarization of the laser light beam with respect to time is shown in Embodiment 1, a concrete example of the configuration of the polarization changing unit 2 will be described in this Embodiment 2.

Figure 2:
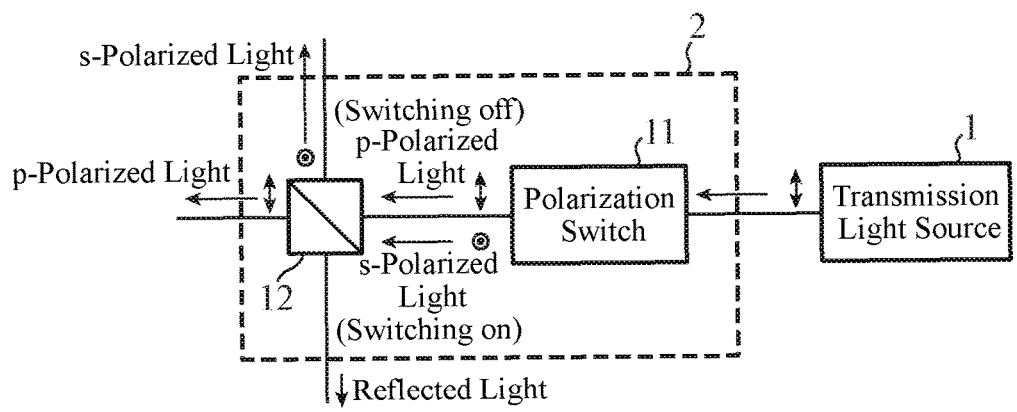
FIG. 2 is a structural diagram showing a polarization changing unit 2 of the laser light transceiver according to Embodiment 2 of the present invention.

FIG. 2 is a structural diagram showing the polarization changing unit 2 of a laser light transceiver according to Embodiment 2 of the present invention.

In the example shown in FIG. 2, a polarization switch 11 is a polarization changing device comprised of, for example, a Pockels cell, a Kerr cell, a ½ wavelength plate equipped with a rotating means, or a waveguide type polarization switch, to change the polarization of a laser light beam outputted from a transmission light source 1 with respect to time.

A polarizer 12 is comprised of, for example, a polarization beam splitter, a thin film polarizer, a Polaroid (registered trademark, the description showing that Polaroid is a registered trademark will be omitted hereafter) prism, or a Wollaston prism, and outputs the laser light beam in accordance with the polarization changed by the polarization switch 11 to either a reflecting mirror 3 or a polarization rotating unit 6.

Next, operations will be explained.

The polarization switch 11 enters the output state A and outputs the p-polarized laser light beam outputted from the transmission light source 1 to the polarizer 12 without changing the polarization direction of the p-polarized laser light beam, at the time of OFF.

The polarization switch 11 enters the output state B, changes the polarization of the laser light beam, which is outputted from the transmission light source 1, from the p polarization to the s polarization by rotating the polarization direction of the laser light beam by 90 degrees, and outputs the s-polarized laser light beam to the polarizer 12, at the time of ON.

As the polarization switch 11, for example, a Pockels cell (a modulation element which constructs an electro-optic modulator) made from lithium niobate (LiNbO$_3$) or the like having a Pockels effect, in which a refractive index varies in proportion to an electric field applied thereto, can be used.

By applying an electric field to the Pockels cell, birefringence occurs because of the electro-optical effect. At this time, because a phase difference occurs between the directions of the fast axis and the slow axis of the Pockels cell which are orthogonal to the optical axis of the Pockels cell, the polarization of the laser light beam passing through the Pockels cell changes. The voltage to be applied to cause the polarization direction of the laser light beam to rotate by 90 degrees is called a ½-wavelength voltage.

Therefore, in the case in which a Pockels cell is used as the polarization switch 11, by switching between no voltage application state and a ½-wavelength voltage application state, the polarization switch 11 can change the polarization direction of the laser light beam with respect to time. Because a Pockels cell changes the polarization of light incident thereupon according to the voltage applied thereto, without having a movable mechanism, its reliability is high and the Pockels cell can change the polarization at a high speed.

As an alternative, as the polarization switch 11, a Kerr cell which is an electro-optic modulator can be used. A Kerr cell has a Kerr effect in which a refractive index varies in proportion to the square of an electric field applied thereto, and, by applying an electric field, the Kerr cell can be made to implement the same operation as that implemented by a Pockels cell.

As an alternative, as the polarization switch 11, a ½ wavelength plate can be used. In the case in which the ½ wavelength plate is used by, for example, mounting a rotary mechanism to the ½ wavelength plate to cause the ½ wavelength plate to rotate periodically, the ½ wavelength plate can implement the same operation as that implemented by a Pockels cell. In this case, although the speed of changing the polarization is low, the polarization switch can be driven with lower power consumption.

In the case in which a waveguide type polarization switch is used as the polarization switch 11, the power of a laser light beam which can be handled is reduced, but an optical system and a drive system for the polarization switch can be reduced in size.

The polarizer 12 outputs the laser light beam to either the reflecting mirror 3 or the polarization rotating unit 6 in accordance with the polarization changed by the polarization switch 11.

In the case in which a polarization beam splitter is used as the polarizer 12, when the polarization beam splitter is disposed in such a way as to reflect an incident light beam in a horizontal direction, a light beam having p polarization passes through the polarization beam splitter while a light beam having s polarization is reflected by the polarization beam splitter.

Accordingly, when receiving a p-polarized laser light beam from the polarization switch 11 at the time of OFF, the polarizer 12 allows the p-polarized laser light beam to pass therethrough toward the reflecting mirror 3, and, after that, the polarizer 12 reflects an s-polarized reflected light beam outputted from the reflecting mirror 3 toward a reception optical system 8.

Further, when receiving an s-polarized laser light beam from the polarization switch 11 at the time of ON, the polarizer reflects the s-polarized laser light beam toward the polarization rotating unit 6, and, after that, the polarizer 12 allows a p-polarized reflected light beam outputted from the polarization rotating unit 6 to pass therethrough toward the reception optical system 8.

When a high-power laser light beam is used in order to observe a target existing at a long distance, the polarizer used is selected in consideration of the tolerance to power.

Figure 3:
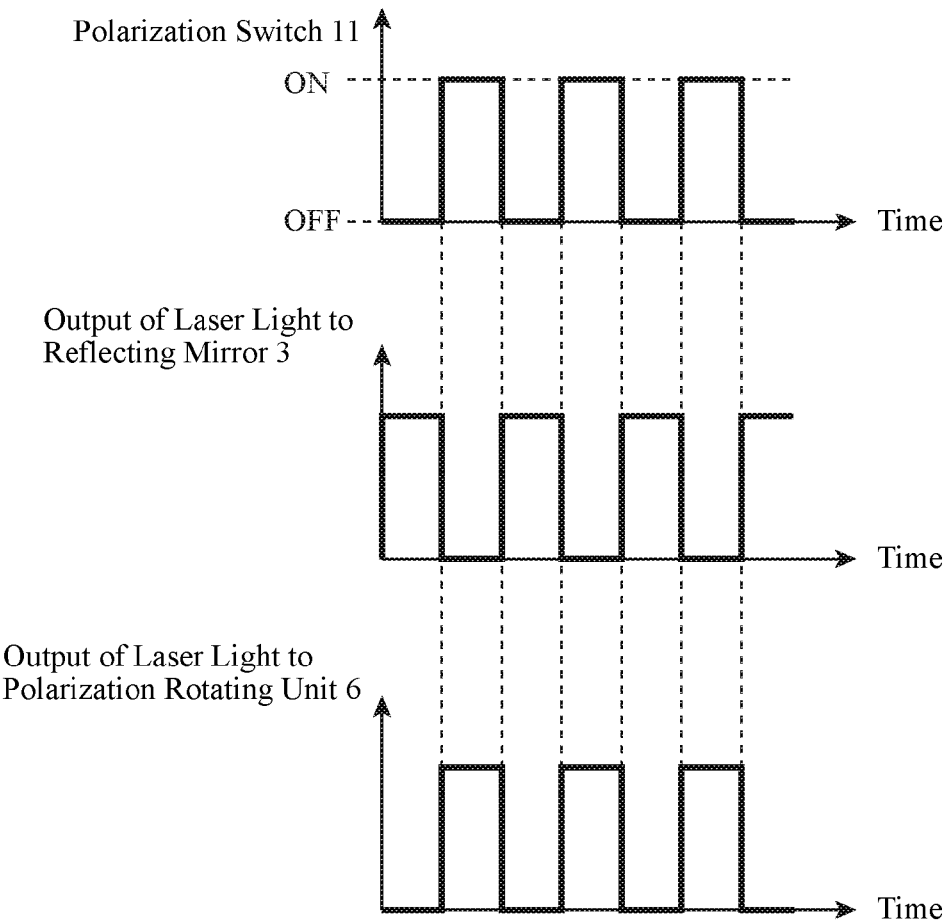
FIG. 3 is an explanatory drawing showing a relation between the on/off state of a polarization switch 11 and the intensity of a laser light beam in each output direction.

FIG. 3 is an explanatory drawing showing a relation between the on/off state of the polarization switch 11, and the intensity in each output direction of the laser light beam.

It can be seen from FIG. 3 that, when the polarization switch 11 is off, the laser light beam is outputted from the polarizer 12 of the polarization changing unit 2 to the reflecting mirror 3, whereas when the polarization switch 11 is on, the laser light beam is outputted from the polarizer 12 of the polarization changing unit 2 to the polarization rotating unit 6.

Therefore, by switching between the on and off states of the polarization switch 11, the eye direction can be changed.

Here, Figure of Merit (FOM) showing the performance index of a laser light transceiver, of which the number of eye directions is one, is expressed by the following equation (1), using the energy E of the laser light beam per pulse, and the repetitive frequency f of pulses.

$$\text{FOM} = E\sqrt{f} \quad (1)$$

Therefore, in the laser light transceiver (Embodiments 1 and 2) which employs two eye directions and changes the polarization of the laser light beam with respect to time, FOM per eye direction is expressed by the following equation (2).

$$FOM = E\sqrt{\frac{f}{2}} \quad (2)$$

In contrast with this, like in the case of the laser light transceiver described in Patent Literature 2, in the case in which a polarization beam splitter splits the power of a laser light beam into two different directions and emits the laser light beams toward two eye directions simultaneously, FOM per eye direction is expressed by the following equation (3).

$$FOM = \frac{E}{2}\sqrt{f} \quad (3)$$

As can be seen from a comparison between the equation (2) and the equation (3), FOM which can be acquired in the case of changing the polarization of a laser light beam with respect to time, like in the case of Embodiments 1 and 2, is higher than that acquired in the case of splitting the power of a laser light beam into two different directions.

Accordingly, when FOM per eye direction is equalized in the aforementioned cases, the laser light transceiver according to any of Embodiments 1 and 2 can reduce the power of the laser light beam which the transmission light source 1 is requested to output, as compared with the laser light transceiver described in Patent Literature 2. As a result, downsizing and weight reduction of the transmission light source 1 can be achieved and the power consumption of the laser light transceiver can be reduced, and the laser light transceiver can be reduced in size and weight.

Figure 4:
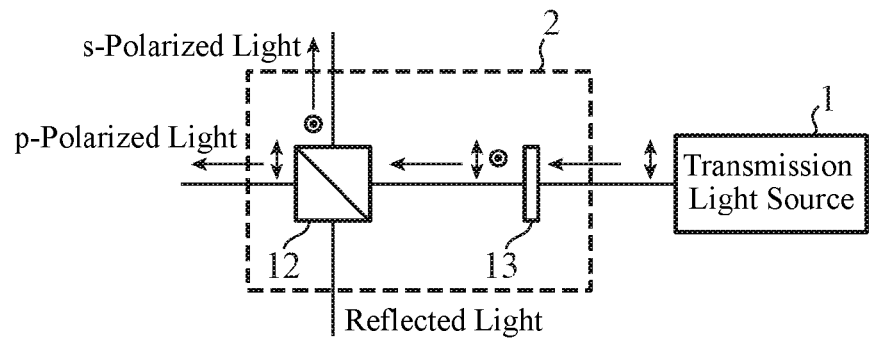
FIG. 4 is a structural diagram showing another example of the polarization changing unit 2 of the laser light transceiver according to Embodiment 2 of the present invention.

Although the example in which the polarization changing unit 2 which consists of the polarization switch 11 and the polarizer 12 changes the polarization of the laser light beam with respect to time is shown in this Embodiment 2, a ½ wavelength plate 13 can be used, as shown in FIG. 4, instead of the polarization switch 11 when the output power (energy) of the laser light beam emitted from each of the transmission optical systems 5 and 7 is sufficient even if the output power is low (for example, when the distance to the target is short).

For example, by rotating the ½ wavelength plate 13 in such a way that the polarization direction forms an angle of 45 degrees with respect to the polarizer 12 which is a polarization beam splitter, the polarizer 12 splits the laser light beam outputted from the transmission light source 1 and passing through the ½ wavelength plate 13 into laser light beams in two directions (outputs a p-polarized laser light beam to the reflecting mirror 3 and outputs an s-polarized laser light beam to the polarization rotating unit 6).

At this time, although the output power of the laser light beam is split into halves by the polarizer 12 which is a polarization beam splitter, and the output power of each split laser light beam is reduced, the laser light beams can be emitted simultaneously toward the two eye directions.

Therefore, the reception optical system 8 can receive reflected light beams from the two eye directions nearly simultaneously.

Further, because the polarization direction of a linearly-polarized laser light beam can be changed to any direction by using the ½ wavelength plate 13, the split ratio of laser light beams after splitting by the polarizer 12 can be set freely.

When the rotation angle of the ½ wavelength plate 13 is made to change with respect to time in such a way that the polarization direction forms an angle of 0 degrees or 90 degrees with respect to the polarizer 12, the polarization of the laser light beam can be changed with respect to time, like in the case of using the polarization switch 11.

However, in this case, a mechanical mechanism for changing the rotation angle of the ½ wavelength plate 13 is needed.

Although the example of using the ½ wavelength plate 13 instead of the polarization switch 11 is shown in this embodiment, when the laser light beam outputted from the transmission light source 1 is circularly polarized, a ¼ wavelength plate can be used instead of the polarization switch 11. In this case, the same effect as that produced by the ½ wavelength plate 13 is produced. In this case, because the ¼ wavelength plate can convert a circularly-polarized light beam into a linearly-polarized light beam having a discretionary polarization direction, the split ratio of laser light beams after splitting by the polarizer 12 can be set freely.

As an alternative, an azimuth rotator for rotating the polarization direction of the laser light beam can be used instead of the polarization switch 11, the same effect as that produced by the ½ wavelength plate 13 is produced.

Embodiment 3

Figure 5:
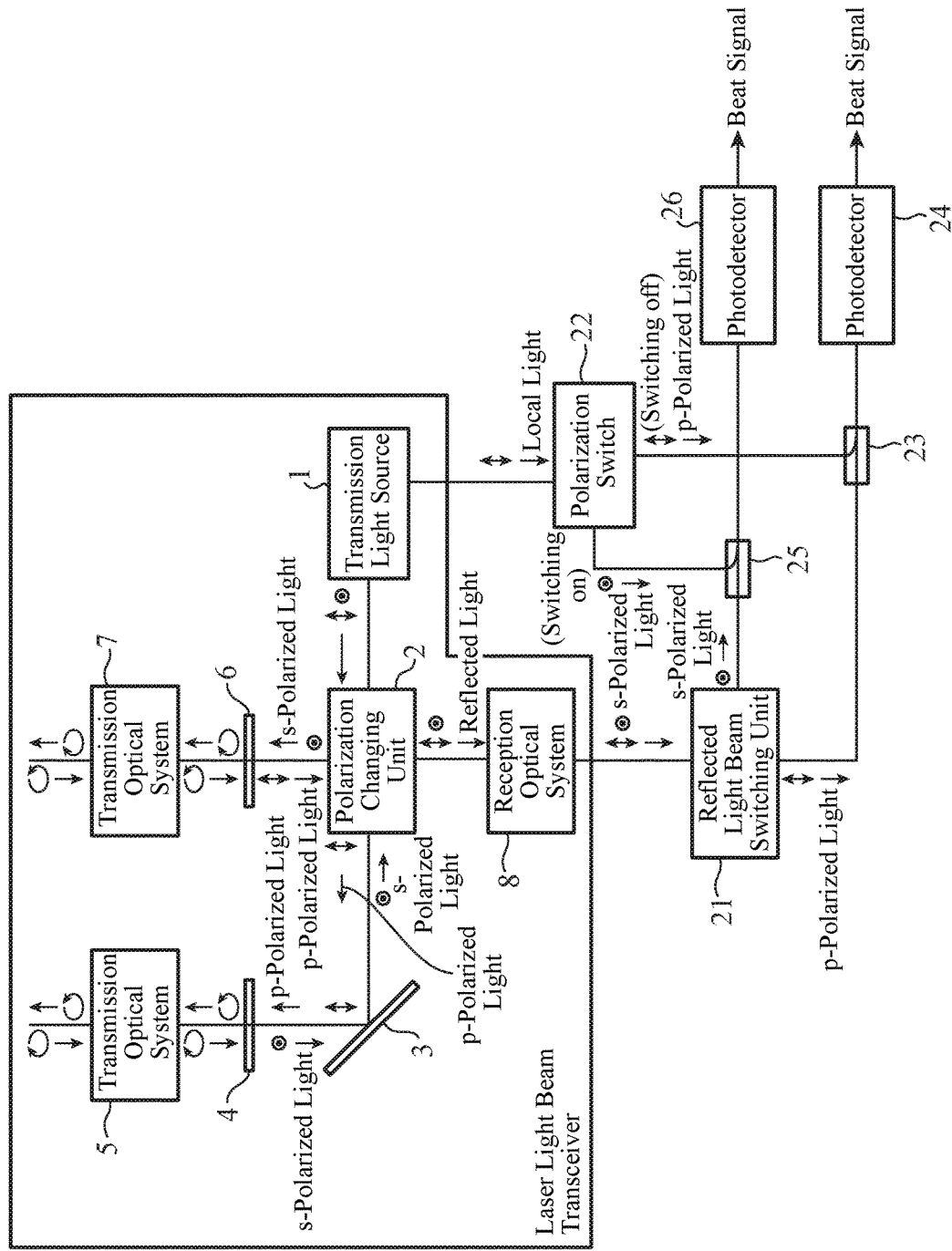
FIG. 5 is a structural diagram showing a laser radar device according to Embodiment 3 of the present invention.

FIG. 5 is a structural diagram showing a laser radar device according to Embodiment 3 of the present invention. The laser radar device shown in FIG. 5 includes a laser light transceiver shown in FIG. 1 mounted therein. In FIG. 5, because the same reference numerals as those shown in FIG. 1 denote the same components or similar components, the explanation of the components will be omitted hereafter.

A reflected light beam switching unit 21 is comprised of, for example, a polarization coupler or a polarizer, and outputs each reflected light beam received by a reception optical system (an s-polarized reflected light beam or a p-polarized reflected light beam) toward a direction corresponding to the polarization of the reflected light beam.

More specifically, the reflected light beam switching unit 21 allows a p-polarized reflected light beam outputted from the reception optical system 8 to pass therethrough and outputs the p-polarized reflected light beam to an optical combiner 23, and reflects an s-polarized reflected light beam outputted from the reception optical system 8 and outputs the s-polarized reflected light beam to an optical combiner 25. The reflected light beam switching unit 21 constructs a reflected light beam switching means.

A polarization switch 22 is comprised of, for example, a Pockels cell, a Kerr cell, a ½ wavelength plate equipped with a rotating means, or a waveguide type polarization switch, and outputs a local light beam corresponding to a laser light beam outputted from a transmission light source 1 (a light beam split from the laser light beam outputted from the transmission light source 1) toward a direction corresponding to the polarization of the local light beam while changing the polarization of the local light beam with respect to time.

More specifically, the polarization switch 22 outputs a p-polarized local light beam outputted from the transmission light source 1 to the optical combiner 23 without changing the polarization direction of the p-polarized local light beam, at the time of OFF, whereas the polarization switch 22 changes the polarization of the p-polarized local light beam outputted from the transmission light source 1 to the s polarization by rotating the polarization direction of the local light beam by 90 degrees, and outputs the s-polarized local light beam to the optical combiner 25, at the time of ON. The polarization switch 22 constructs a local light beam switching means.

The optical combiner 23 is comprised of, for example, a 3 dB coupler, a beam splitter, a partially reflecting mirror, etc., and optically combines the p-polarized reflected light beam outputted from the reflected light beam switching unit 21 and the p-polarized local light beam outputted from the polarization switch 22, to generate a composite light beam, and outputs the composite light beam (a signal having a difference frequency between the reflected light beam and the local light beam) to an optical detector 24.

The optical detector 24 is comprised of, for example, a photo diode or a balanced receiver, and converts the composite light beam outputted from the optical combiner 23 into an electric signal and outputs a beat signal which is the electric signal.

A first heterodyne detecting unit is comprised of the optical combiner 23 and the optical detector 24.

The optical combiner 25 is comprised of, for example, a 3 dB coupler, a beam splitter, a partially reflecting mirror, etc., and optically combines the s-polarized reflected light beam outputted from the reflected light beam switching unit 21 and the s-polarized local light beam outputted from the polarization switch 22, to generate a composite light beam, and outputs the composite light beam (a signal having a difference frequency between the reflected light beam and the local light beam) to an optical detector 26.

The optical detector 26 is comprised of, for example, a photo diode or a balanced receiver, and converts the composite light beam outputted from the optical combiner 25 into an electric signal and outputs a beat signal which is the electric signal.

A second heterodyne detecting unit is comprised of the optical combiner 25 and the optical detector 26.

Further, a heterodyne detecting means is comprised of the reflected light beam switching unit 21, the polarization switch 22, the optical combiners 23 and 25, and the optical detectors 24 and 26.

Next, operations will be explained.

When the reception optical system 8 receives a reflected light beam (an s-polarized reflected light beam or a p-polarized reflected light beam), the reflected light beam switching unit 21 changes the output destination of the reflected light beam with respect to time in accordance with the polarization of the reflected light beam (the s-polarized reflected light beam or the p-polarized reflected light beam), in the same way that the laser light transceiver according to any of above-mentioned Embodiments 1 and 2 does.

More specifically, when receiving a p-polarized reflected light beam from the reception optical system 8, the reflected light beam switching unit 21 allows the p-polarized reflected light beam to pass therethrough and outputs the p-polarized reflected light beam to the optical combiner 23.

In contrast, when receiving an s-polarized reflected light beam from the reception optical system 8, the reflected light beam switching unit 21 reflects the s-polarized reflected light beam and outputs the s-polarized reflected light beam to the optical combiner 25.

Because the polarization direction of the reflected light beam inputted from the reception optical system 8 to the reflected light beam switching unit 21 changes with respect to time in accordance with the switching between OFF and ON of the polarization switch 11, the output destination of the reflected light beam outputted from the reflected light beam switching unit 21 is switched with respect to time.

During a time period during which a polarization changing unit 2 outputs a p-polarized laser light beam and acquires an s-polarized reflected light beam, the polarization switch 22 enters the ON state, and, when then receiving a p-polarized local light beam from the transmission light source 1 (a light beam split from the p-polarized laser light beam), the polarization switch 22 changes the polarization of the polarized local light beam from the p polarization to the s polarization by rotating the polarization direction of the p-polarized local light beam by 90 degrees and outputs the s-polarized local light beam to the optical combiner 25.

Further, during a time period during which the polarization changing unit 2 outputs an s-polarized laser light beam and acquires a p-polarized reflected light beam, the polarization switch 22 enters the OFF state, and when then receiving a p-polarized local light beam from the transmission light source 1, the polarization switch 22 outputs the p-polarized local light beam to the optical combiner 23 without changing the polarization direction of the p-polarized local light beam.

The polarization changing unit 2 and the polarization switch 22 can be synchronized with each other in their operation timings. Further, a delay time can be provided for either of the polarization changing unit 2 and the polarization switch 22. By causing the polarization changing unit 2 and the polarization switch 22 to be synchronized with each other in their operation timings, the laser radar device can carry out heterodyne detection efficiently. As an alternative, by providing a delay time for either of the polarization changing unit and the polarization switch, the laser radar device can carry out heterodyne detection except in a transient state in which the polarization changing unit 2 changes the polarization.

The optical combiner 23 optically combines the p-polarized reflected light beam outputted from the reflected light beam switching unit 21 and the p-polarized local light beam outputted from the polarization switch 22, to generate a composite light beam and outputs the composite light beam (a signal having a difference frequency between the reflected light beam and the local light beam) to the optical detector 24.

When receiving the composite light beam from the optical combiner 23, the optical detector 24 converts the composite light beam into an electric signal and outputs a beat signal which is the electric signal.

The optical combiner 25 optically combines the s-polarized reflected light beam outputted from the reflected light beam switching unit 21 and the s-polarized local light beam outputted from the polarization switch 22, to generate a composite light beam, and outputs the composite light beam (a signal having a difference frequency between the reflected light beam and the local light beam) to the optical detector 26.

When receiving the composite light beam from the optical combiner 25, the optical detector 26 converts the composite light beam into an electric signal and outputs a beat signal which is the electric signal.

The beat signals outputted from the optical detectors 24 and 26 are inputted to a signal processor not illustrated, and the signal processor analyzes the frequency components of the beat signals, thereby calculating the moving speed (wind speed) of a target. Because the laser radar device emits laser light beams toward two eye directions, the laser radar device can carry out observations in the two eye directions and measure the direction of the wind in the plane including the two directions.

Further, the laser radar device can calculate the distance to a target from the time which has elapsed until the laser light transceiver emits a laser light beam and receives a reflected light beam. Because the laser radar device emits the laser light beams toward the two eye directions, the laser radar device can carry out observations in the two eye directions and calculate the direction of the wind in the plane including the two directions by performing an arithmetic operation or the like.

As can be seen from the above description, because the laser radar device according to this Embodiment 3 is configured so as to include the polarization changing unit 2 to output a laser light beam toward a direction corresponding to the polarization of the laser light beam while changing the polarization of the laser light beam outputted from the transmission light source 1 with respect to time, there is provided an advantage of being able to transmit a laser light beam, whose power is not decreased, in two eye directions without mechanically scanning with the laser light beam, like in the case of above-mentioned Embodiments 1 and 2.

Further, because the polarization switch 22 according to this Embodiment 3 is configured so as to output a local light beam toward a direction corresponding to the polarization of the local light beam while changing the polarization of the local light beam split from the laser light beam outputted from the transmission light source 1 with respect to time, the laser radar device does not have to include a light source for the local light beam mounted therein. Therefore, there is provided an advantage of being able to downsize the laser radar device and also reduce the power consumption of the laser radar device.

Further, because the laser radar device according to this Embodiment 3 is configured so as to change the polarization of the local light beam with respect to time by using the polarization switch 22 and cause this polarization switch to output the local light beam toward the direction corresponding to the polarization of the local light beam, thereby causing the polarization direction of the local light beam to match that of the reflected light beam outputted from the reception optical system 8, the laser radar device can carry out heterodyne detection efficiently. Further, because the laser radar device can reduce the power of the local light beam which the transmission light source 1 is requested to output, there is provided an advantage of being able to downsize the laser radar device and also reduce the power consumption of the laser radar device.

In this Embodiment 3, in the case in which some optical fiber type components are used, for example, in the case in which a polarization coupler is used as the reflected light beam switching unit 21, a waveguide type polarization switch is used as the polarization switch 22, and 3 dB couplers are used as the optical combiners 23 and 25, the reception system of the laser radar device can be configured by using connections of optical fibers. In this case, the alignment of the laser light beam becomes unnecessary, and the laser radar device is configured so as to become smaller in size and operate with high stability. In addition, by using polarization-holding optical fiber parts as these components, the laser radar device can be configured more easily.

Further, in the case in which balanced receivers are used as the optical detectors 24 and 26, the laser radar device can carry out high-sensitivity detection while reducing the influence of noise.

Embodiment 4

Figure 6:
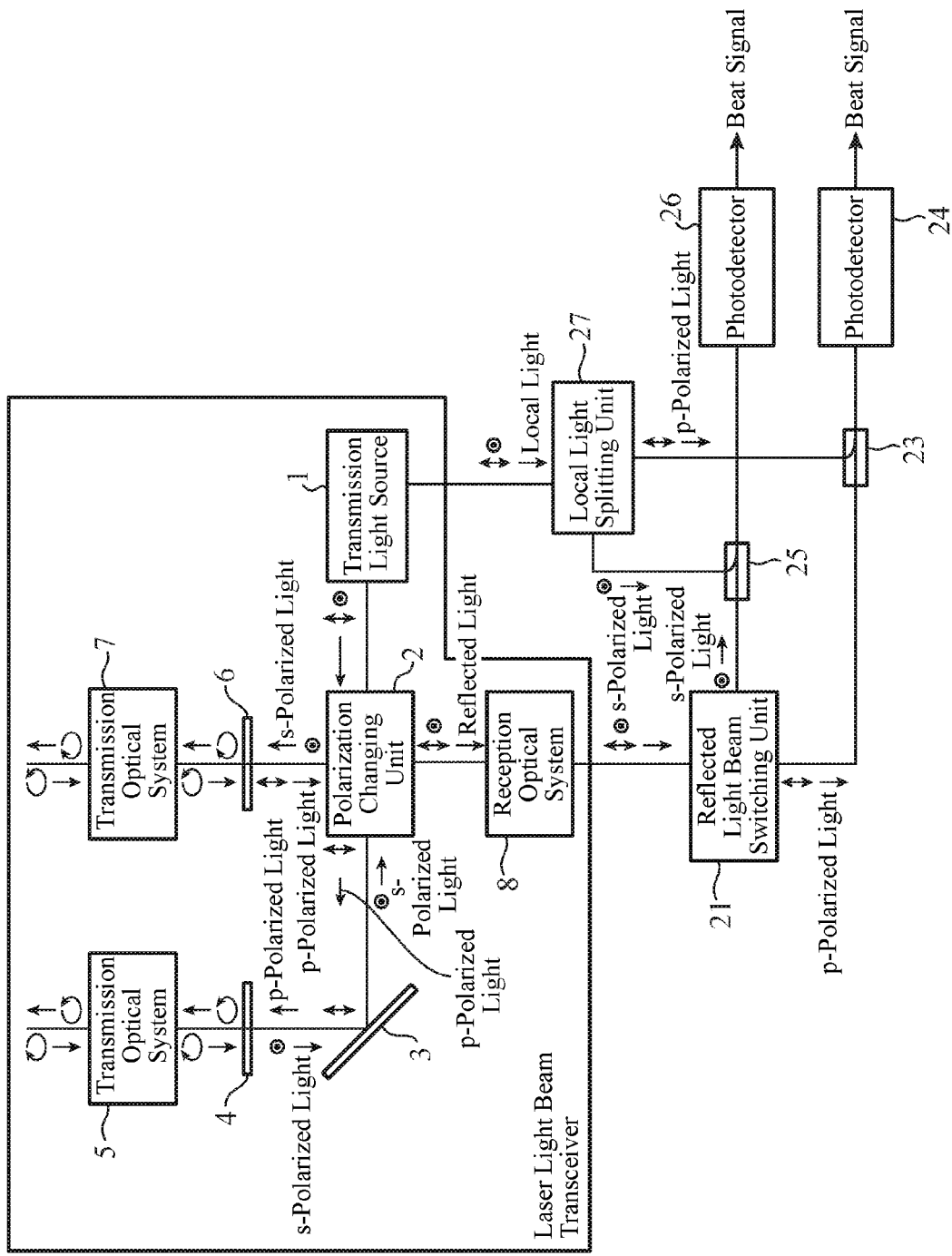
FIG. 6 is a structural diagram showing a laser radar device according to Embodiment 4 of the present invention.

FIG. 6 is a structural diagram showing a laser radar device according to Embodiment 4 of the present invention. In FIG. 6, because the same reference numerals as those shown in FIG. 5 denote the same components or like components, the explanation of the components will be omitted hereafter.

A local light splitting unit 27 is comprised of, for example, a polarization coupler, a polarization beam splitter, a thin film polarizer, a Polaroid plate, or a polarizer such a Glan-laser prism or a Wollaston prism, and splits a local light beam outputted from a transmission light source 1 (a light beam split from a laser light beam) into beams in two directions. In the case in which a polarizing coupler is used as the local light splitting unit 27, the laser radar device can be configured using optical fibers. The local light splitting unit 27 constructs a local light beam splitting means.

Although the example in which the polarization switch 22 switches between its on and off states with respect to time, and outputs a p-polarized local light beam to the optical combiner 23 at the time of OFF and outputs an s-polarized local light beam to the optical combiner 25 at the time of ON is shown in above-mentioned Embodiment 3, when receiving a local light beam from the transmission light source 1, the laser radar device can be configured in such a way that the local light splitting unit 27 splits the local light beam into two beams, thereby outputting a p-polarized local light beam to an optical combiner 23 and also outputting an s-polarized local light beam to an optical combiner 25 at the same time, as explained in Embodiment 4 shown in FIG. 6.

In the case in which a polarization coupler is used as the local light splitting unit 27, the power of the local light beam outputted from the transmission light source 1 can be split into halves by simply causing the local light beam to enter the polarization coupler in such a way that the polarization of the local light beam is of a fifty-fifty mix of the p polarization and the s polarization.

By using the local light splitting unit 27, instead of the polarization switch 22, a cost reduction can be achieved and the reliability of the laser radar device can be improved, but the power of the local light beam has to be doubled.

Embodiment 5

Figure 7:
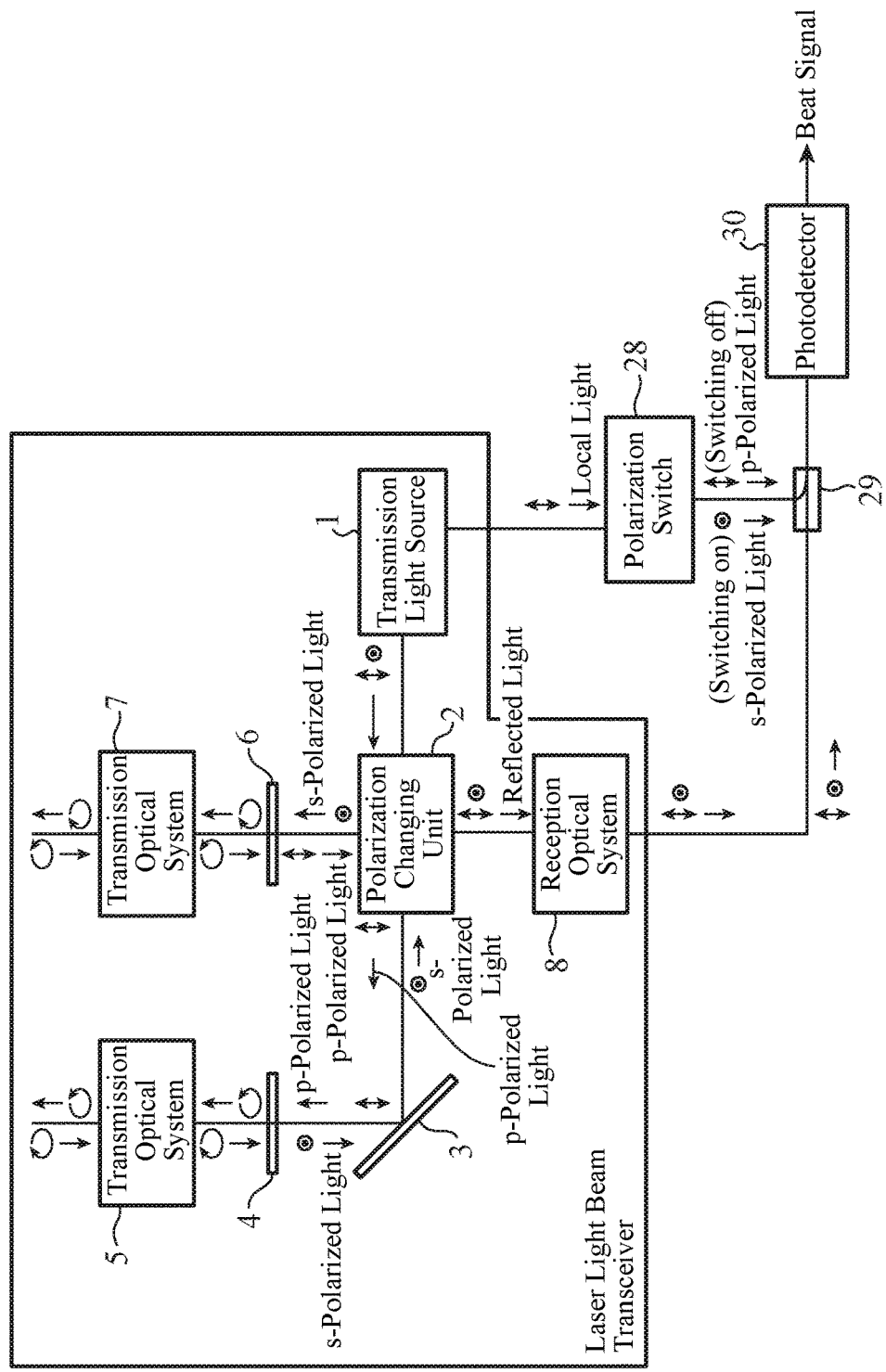
FIG. 7 is a structural diagram showing a laser radar device according to Embodiment 5 of the present invention.

FIG. 7 is a structural diagram showing a laser radar device according to Embodiment 5 of the present invention. In FIG. 7, because the same reference numerals as those shown in FIG. 5 denote the same components or like components, the explanation of the components will be omitted hereafter.

A polarization switch 28 is a polarization changing device comprised of, for example, a Pockels cell, a Kerr cell, a ½ wavelength plate equipped with a rotating means, or a waveguide type polarization switch, to change the polarization of a p-polarized local light beam outputted from a transmission light source 1 (a light beam split from a p-polarized laser light beam) with respect to time.

As a result, although the polarization switch 28 alternately outputs a p-polarized local light beam and an s-polarized local light beam, like the polarization switch 22 shown in FIG. 5, the polarization switch 28 outputs the p-polarized local light beam and the s-polarized local light beam to an identical optical combiner 29 without changing the output destination between the p-polarized local light beam and the s-polarized local light beam, unlike the polarization switch 22 shown in FIG. 5. The polarization switch 28 constructs a local light beam switching means.

The optical combiner 29 is comprised of, for example, a 3 dB coupler, a beam splitter, a partially reflecting mirror, etc., and optically combines a p-polarized reflected light beam outputted from a reception optical system 8 and the p-polarized local light beam outputted from the polarization switch 28, to generate a composite light beam, and outputs the composite light beam to an optical detector 30, and also optically combines an s-polarized reflected light beam outputted from the reception optical system 8 and the s-polarized local light beam outputted from the polarization switch 28, to generate a composite light beam, and outputs the composite light beam to the optical detector 30.

The optical detector 30 is comprised of, for example, a photo diode or a balanced receiver, and converts the composite light beam outputted from the optical combiner 29 into an electric signal and outputs a beat signal which is the electric signal.

A heterodyne detecting unit is comprised of the optical combiner 29 and the optical detector 30.

Further, a heterodyne detecting means is comprised of the polarization switch 28, the optical combiner 29 and the optical detector 30.

Next, operations will be explained.

The reception optical system 8 receives an s-polarized reflected light beam which is reflected by a polarization changing unit 2 after being outputted from a reflecting mirror 3, like that according to any of above-mentioned Embodiments 1 to 4. The reception optical system also receives a p-polarized reflected light beam which passes through the polarization changing unit 2 after being outputted from a polarization rotating unit 6. More specifically, the polarization direction of the reflected light beam received by the reception optical system 8 changes with respect to time.

The reception optical system 8 outputs the received reflected light beam to the optical combiner 29.

During a time period during which the polarization changing unit 2 outputs a p-polarized laser light beam and acquires an s-polarized reflected light beam, the polarization switch 28 enters the ON state, and, when then receiving a p-polarized local light beam from the transmission light source 1, changes the polarization of the local light beam from the p polarization to the s polarization by rotating the polarization direction of the p-polarized local light beam by 90 degrees, and outputs the s-polarized local light beam to the optical combiner 29.

Further, during a time period during which the polarization changing unit 2 outputs an s-polarized laser light beam and acquires a p-polarized reflected light beam, the polarization switch 28 enters the OFF state, and, when then receiving a p-polarized local light beam from the transmission light source 1, outputs the p-polarized local light beam to the optical combiner 29 without changing the polarization of the p-polarized local light beam.

Because the timing of changing the polarization of the laser light beam in the polarization changing unit 2 is synchronized with the timing of changing the polarization of the laser light beam in the polarization switch 28, the s-polarized local light beam is outputted from the polarization switch 28 to the optical combiner 29 at the time when the s-polarized reflected light beam is outputted from the reception optical system 8 to the optical combiner 29. Further, the p-polarized local light beam is outputted from the polarization switch 28 to the optical combiner 29 at the time when the p-polarized reflected light beam is outputted from the reception optical system 8 to the optical combiner 29.

The optical combiner 29 optically combines the p-polarized reflected light beam outputted from the reception optical system 8 and the p-polarized local light beam outputted from the polarization switch 28, to generate a composite light beam, and outputs the composite light beam to the optical detector 30.

Further, the optical combiner 29 optically combines the s-polarized reflected light beam outputted from the reception optical system 8 and the s-polarized local light beam outputted from the polarization switch 28, to generate a composite light beam, and outputs the composite light beam to the optical detector 30.

When receiving each of the composite light beams from the optical combiner 29, the optical detector 30 converts the composite light beam into an electric signal, and outputs a beat signal which is the electric signal.

Although this Embodiment 5 can provide the same advantages as those provided by any of above-mentioned Embodiments 3 and 4, the laser radar device according to this embodiment can be configured in a small size and at a low cost because the reflected light beam switching unit 21 become unnecessary and, by using a single heterodyne detecting unit, the laser radar device can be configured.

The polarization switch 28 can be alternatively disposed on a route from the reception optical system 8 to the optical combiner 29, and can be configured so as to change the polarization direction of a reflected light beam received thereby. However, because a loss occurs in the received light beam, it is desirable to dispose the polarization switch on the route of the local light beam when the power of the local light beam has a margin.

Although the example in which the polarization direction of the reflected light beam received by the reception optical above-mentioned Embodiments 3 to 5, the reception optical system 8 receives an s-polarized reflected light beam and a p-polarized reflected light beam nearly simultaneously in the case in which a ½ wavelength plate 13, a ¼ wavelength plate, or the like is used instead of the polarization switch 11 which constructs the polarization changing unit 2, as shown in FIG. 4.

Figure 8:
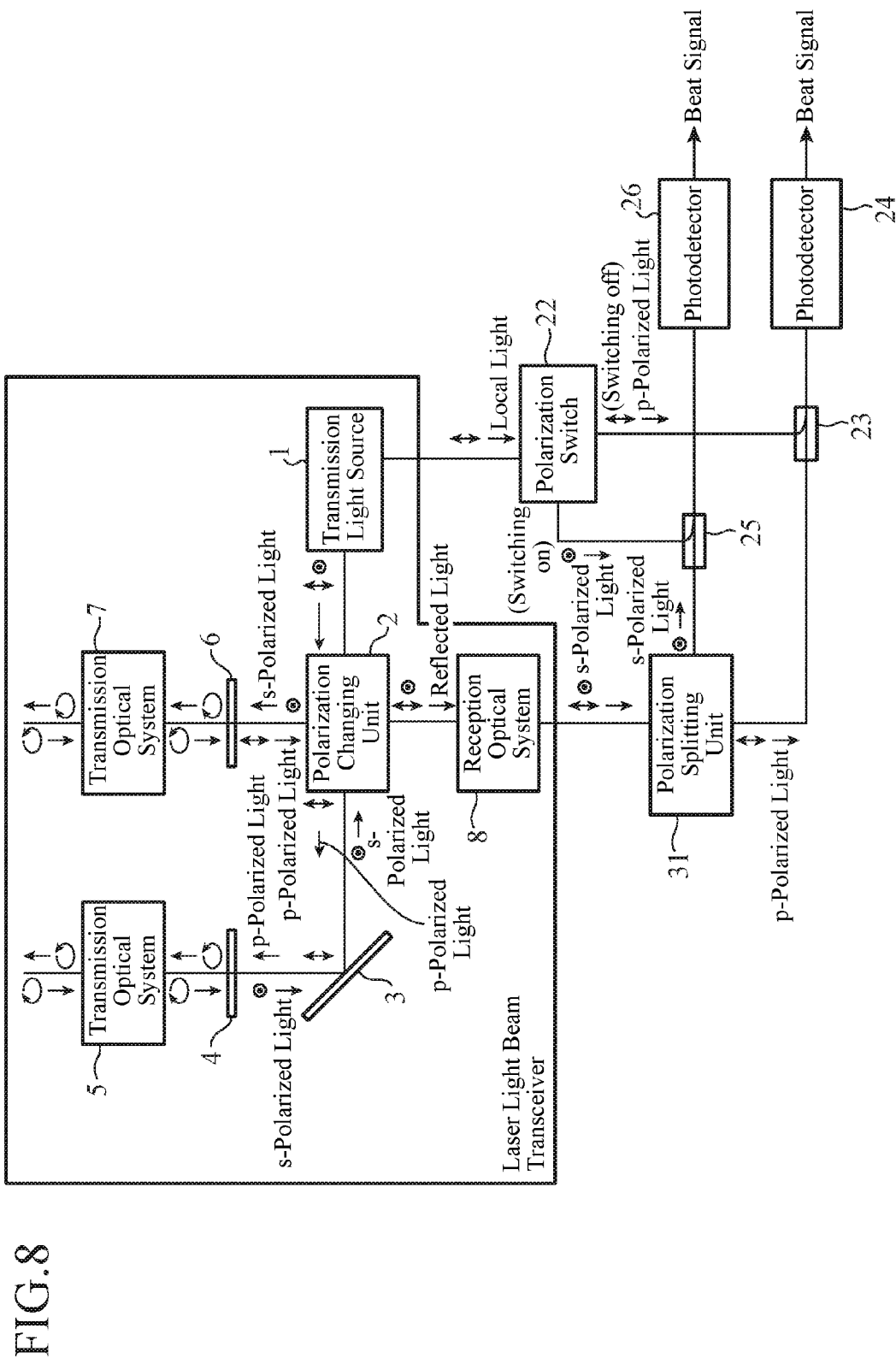
FIG. 8 is a structural diagram showing another example of the laser radar device according to Embodiment 5 of the present invention.

In this case, as shown in FIG. 8, the laser radar device can be configured so as to include, instead of the reflected light beam switching unit 21, a polarization splitting unit 31 to output an s-polarized reflected light beam and a p-polarized reflected light beam received by the reception optical system 8 in a splitting manner (a polarization splitting unit to output the p-polarized reflected light beam to an optical combiner 23 and output the s-polarized reflected light beam to an optical combiner 23).

In addition, also in a polarization switch 22, by using a ½ wavelength plate 13, a ¼ wavelength plate, or the like, an s-polarized local light beam and a p-polarized local light beam are outputted simultaneously. As a result, the laser radar device can simultaneously carry out heterodyne detection on reflected light beams from two eye directions, and can simultaneously carry out observations in the two eye directions.

While the invention has been described in its preferred embodiments, it is to be understood that any combination of two or more of the above-mentioned embodiments can be made, various changes can be made in any component in accordance with any one of the above-mentioned embodiments, and any component in accordance with any one of the above-mentioned embodiments can be omitted within the scope of the invention.

INDUSTRIAL APPLICABILITY

The laser light transceiver and the laser radar device according to the present invention are suitable for devices that need to carry out observations in two eye directions.

REFERENCE SIGNS LIST

1 transmission light source, 2 polarization changing unit (polarization changing means), 3 reflecting mirror (first transmission and reception optical system), 4 polarization rotating unit (first transmission and reception optical system), 5 transmission optical system (first transmission and reception optical system), 6 polarization rotating unit (second transmission and reception optical system), 7 transmission optical system (second transmission and reception optical system), 8 reception optical system, 11 polarization switch, 12 polarizer, 13 ½ wavelength plate, 21 reflected light beam switching unit (reflected light beam switching unit, heterodyne detecting means), 22 polarization switch (local light beam switching means, heterodyne detecting means), 23 optical combiner (first heterodyne detecting unit, heterodyne detecting means), 24 optical detector (first heterodyne detecting unit, heterodyne detecting means), 25 optical combiner (second heterodyne detecting unit, heterodyne detecting means), 26 optical detector (second heterodyne detecting unit, heterodyne detecting means), 27 local light splitting unit (local light beam splitting unit, heterodyne detecting means), 28 polarization switch (local light beam switching means, heterodyne detecting means), 29 optical combiner (heterodyne detecting unit, heterodyne detecting means), 30 optical detector (heterodyne detecting unit, heterodyne detecting means), and 31 polarization splitting unit.

The invention claimed is:

1. A laser radar device comprising:
   a light source configured to output a laser light beam;
   a polarization changing unit configured to output said laser light beam toward a direction corresponding to each of p-polarization and s-polarization of said laser light beam while changing the p polarization and the s-polarization of said laser light beam outputted from said light source with respect to time;
   a first transmission and reception optical system configured to emit the laser light beam outputted from said polarization changing unit into space, and receiving a reflected light beam of said laser light beam, the reflected light beam being reflected by a first observation target existing in the space;
   a second transmission and reception optical system disposed in a direction different from that in which said first transmission and reception optical system is disposed, configured to emit the laser light beam outputted from said polarization changing unit into the space, and receive a reflected light beam of said laser light beam, the reflected light beam being reflected by a second observation target existing in the space;
   a reception optical system configured to receive the reflected light beam received by said first transmission and reception optical system, and also receive the reflected light beam received by said second transmission and reception optical system; and
   a heterodyne detecting unit configured to combine each of the reflected light beams received by said reception optical system, and a local light beam corresponding to the laser light beam outputted from said light source, to acquire beat signals,
   wherein said heterodyne detecting unit includes:
   a reflected light beam switching unit configured to output the reflected light beams received by said reception optical system toward a direction corresponding to each of p-polarization and s-polarization of said reflected light beams;
   a local light beam switching unit configured to output the local light beam corresponding to the laser light beam toward a direction corresponding to each of p-polarization and s-polarization of said local light beam while changing the p polarization and the s-polarization of said local light beam outputted from said light source with respect to time;
   a first heterodyne detecting unit configured to combine one of the reflected light beams outputted from said reflected light beam switching unit and the local light beam outputted from said local light beam switching unit, to acquire a beat signal; and
   a second heterodyne detecting unit disposed in a direction different from that in which said first heterodyne detecting unit is disposed, configured to combine another of the reflected light beams outputted from said reflected light beam switching unit and the local light beam outputted from said local light beam switching unit, to acquire a beat signal.

2. The laser radar device according to claim 1,
   wherein said polarization changing unit comprises:
   a polarization changing device configured to change the p polarization and the s-polarization of the laser light beam outputted from said light source with respect to time, and
   a polarizer configured to output said laser light beam to either said first transmission and reception optical system or said second transmission and reception optical system in accordance with the polarization changed by said polarization changing device.

3. The laser radar device according to claim 2, wherein said polarizer reflects the reflected light beams received by said first and second transmission and reception optical systems toward a direction in which said reception optical system is disposed.

4. A laser radar device comprising:
   a light source to output a laser light beam;
   a polarization changing unit configured to output said laser light beam toward a direction corresponding to each of p-polarization and s-polarization of said laser light beam while changing the p polarization and the s-polarization of said laser light beam outputted from said light source with respect to time;
   a first transmission and reception optical system configured to emit the laser light beam outputted from said polarization changing unit into space, and receive a reflected light beam of said laser light beam, the reflected light beam being reflected by a first observation target existing in the space;
   a second transmission and reception optical system disposed in a direction different from that in which said first transmission and reception optical system is disposed, configured to emit the laser light beam outputted from said polarization changing unit into the space, and receive a reflected light beam of said laser light beam, the reflected light beam being reflected by a second observation target existing in the space;
   a reception optical system configured to receive the reflected light beam received by said first transmission and reception optical system, and also receive the reflected light beam received by said second transmission and reception optical system; and
   a heterodyne detecting unit configured to combine each of the reflected light beams received by said reception optical system, and a local light beam corresponding to the laser light beam outputted from said light source, to acquire beat signals,
   wherein said heterodyne detecting unit includes:
   a reflected light beam switching unit configured to output the reflected light beams received by said reception optical system toward a direction corresponding to each of p-polarization and s-polarization of said reflected light beams;
   a local light beam splitting unit configured to split the local light beam corresponding to the laser light beam outputted from said light source into beams in two directions;
   a first heterodyne detecting unit configured to combine one of the reflected light beams outputted from said reflected light beam switching unit and a local light beam which is one of the beams split by said local light beam splitting unit, to acquire a beat signal; and a second heterodyne detecting unit configured to combine another of the reflected light beams outputted from said reflected light beam switching unit and a local light beam which is another of the beams split by said local light beam splitting unit, to acquire a beat signal.

5. The laser radar device according to claim 4,
wherein said polarization changing unit comprises:
a polarization changing device configured to change the p polarization and the s-polarization of the laser light beam outputted from said light source with respect to time, and
a polarizer configured to output said laser light beam to either said first transmission and reception optical system or said second transmission and reception optical system in accordance with the polarization changed by said polarization changing device.

6. The laser radar device according to claim 5, wherein said polarizer reflects the reflected light beams received by said first and second transmission and reception optical systems toward a direction in which said reception optical system is disposed.

\* \* \* \* \*

UNITED STATES PATENT AND TRADEMARK OFFICE
CERTIFICATE OF CORRECTION

PATENT NO. : 10,353,054 B2
APPLICATION NO. : 15/502750
DATED : July 16, 2019
INVENTOR(S) : Yasuhiro Hinokuma et al.

It is certified that error appears in the above-identified patent and that said Letters Patent is hereby corrected as shown below:

In the Claims

In Column 19, in Claim 1, at Line 23, "the p polarization" should be changed to --the p-polarization--.
In Column 19, in Claim 1, at Line 60, "the p polarization" should be changed to --the p-polarization--.
In Column 20, in Claim 2, at Lines 10-11, "the p polarization" should be changed to --the p-polarization--.
In Column 20, in Claim 4, at Line 29, "the p polarization" should be changed to --the p-polarization--.
In Column 21, in Claim 5, at Lines 11-12, "the p polarization" should be changed to --the p-polarization--.

Signed and Sealed this
Third Day of September, 2019

Andrei Iancu
*Director of the United States Patent and Trademark Office*